US008343675B2

(12) United States Patent  (10) Patent No.: US 8,343,675 B2
Manabe et al.  (45) Date of Patent: Jan. 1, 2013

(54) FUEL CELL SYSTEM

(75) Inventors: Kota Manabe, Toyota (JP); Kimihide Horio, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/101,664

(22) Filed: May 5, 2011

(65) Prior Publication Data

US 2011/0207011 A1  Aug. 25, 2011

Related U.S. Application Data

(62) Division of application No. 12/084,826, filed as application No. PCT/JP2006/324623 on Dec. 5, 2006.

(30) Foreign Application Priority Data

Dec. 7, 2005 (JP) ................................. 2005-353666
Nov. 13, 2006 (JP) ................................. 2006-306314

(51) Int. Cl.
 *H01M 8/04* (2006.01)
(52) U.S. Cl. ......... 429/430; 429/428; 429/431; 429/432
(58) Field of Classification Search .................. 429/431, 429/432, 447, 462
See application file for complete search history.

(56) References Cited

U.S. PATENT DOCUMENTS

| 5,675,467 | A | 10/1997 | Nishimura et al. | |
|---|---|---|---|---|
| 6,127,057 | A | 10/2000 | Gorman | |
| 6,255,008 | B1 | 7/2001 | Iwase | |
| 2001/0006335 | A1* | 7/2001 | Kondou et al. | 318/727 |
| 2003/0211372 | A1 | 11/2003 | Adams et al. | |
| 2003/0224227 | A1* | 12/2003 | Voss et al. | 429/13 |
| 2004/0197610 | A1 | 10/2004 | Drunert | |
| 2005/0048335 | A1 | 3/2005 | Fields et al. | |
| 2005/0069740 | A1 | 3/2005 | Ulmer et al. | |
| 2007/0275276 | A1 | 11/2007 | Saeki et al. | |

FOREIGN PATENT DOCUMENTS

| DE | 10 2004 019 085 A1 | 2/2004 |
|---|---|---|
| DE | 10 2004 007 179 A1 | 9/2004 |
| DE | 10 2005 002 506 A1 | 7/2006 |
| JP | 4-308432 A | 10/1992 |
| JP | 10-326625 A | 12/1998 |
| JP | 10-336890 | 12/1998 |
| JP | 11-283648 A | 10/1999 |

(Continued)

OTHER PUBLICATIONS

Office Action issued Jan. 10, 2012 in German Patent Application No. 11 2006 003 337.9-45 and English translation thereof.

*Primary Examiner* — Ula C Ruddock
*Assistant Examiner* — Scott J Chmielecki
(74) *Attorney, Agent, or Firm* — Kenyon & Kenyon LLP

(57) ABSTRACT

There is disclosed a fuel cell system capable of stably operating auxiliary devices driven at a high voltage and the like, even in a case where a poisoned electrode catalyst is recovered or a fuel cell is warmed up. On detecting that the electrode catalyst is poisoned, a controller derives a target operation point which is sufficient for recovering an activity of the poisoned electrode catalyst. Then, shift of the operation point from a usual operation point to a low-efficiency operation point is realized so that an output power is held to be constant.

2 Claims, 12 Drawing Sheets

FOREIGN PATENT DOCUMENTS

| | | |
|---|---|---|
| JP | 2000-36308 A | 2/2000 |
| JP | 2000-188120 A | 7/2000 |
| JP | 2002-280034 A | 9/2002 |
| JP | 2003-504807 A | 2/2003 |
| JP | 2003-132960 A | 5/2003 |
| JP | 2003-235162 A | 8/2003 |
| JP | 2004-87425 A | 3/2004 |
| JP | 2004-214004 A | 7/2004 |
| JP | 2005-44708 A | 2/2005 |
| JP | 2005-71626 A | 3/2005 |
| JP | 2005-108815 A | 4/2005 |
| JP | 2005-190938 A | 7/2005 |
| JP | 2005-228524 A | 8/2005 |
| JP | 2005-228525 A | 8/2005 |
| JP | 2007-318938 A | 12/2007 |
| JP | 2007-321461 A | 12/2007 |
| WO | WO 2007/063783 A1 | 6/2007 |
| WO | WO 2007/139169 A1 | 12/2007 |

\* cited by examiner

FUEL CELL SYSTEM

This is a division of application Ser. No. 12/084,826 filed 9 May 2008, which is a 371 national phase application of PCT/JP2006/324623 filed 5 Dec. 2006, which claims priority of Japanese Patent Applications No. 2005-353666 filed 7 Dec. 2005 and No. 2006-306314 filed 13 Nov. 2006, respectively, the contents of which are incorporated herein by reference.

TECHNICAL FIELD

The present invention relates to a fuel cell system.

BACKGROUND ART

In general, a fuel cell has a poor actuation property as compared with another power source. A power generation efficiency of such a fuel cell decreases owing to lowering of a temperature and poisoning of an electrode catalyst, and there occurs a case where a desired voltage/current cannot be supplied so that an apparatus (a motor or the like) cannot be actuated.

In view of such a situation, a method is suggested in which at least one of an anode fuel (e.g., a fuel gas) and a cathode fuel (e.g., an oxidizing gas) to be supplied to electrodes is brought into a shortage state, and an overvoltage of a part of the electrodes is increased to raise the temperature of the fuel cell, whereby the poisoned electrode catalyst is recovered and the fuel cell is warmed up (e.g., see Patent Document 1 described below).

[Patent Document 1] Japanese Patent Publication No. 2003-504807

DISCLOSURE OF THE INVENTION

However, in a case where a poisoned electrode catalyst is recovered and a fuel cell is warmed up by the above method, there are problems that a voltage of the fuel cell lowers in accordance with such an operation and that an auxiliary device (a motor of a pump or the like) to be driven with a high voltage cannot stably be operated.

The present invention has been developed in view of the above-mentioned situation, and an object thereof is to provide a fuel cell system capable of stably operating auxiliary devices to be driven with a high voltage, even in a case where a poisoned electrode catalyst is recovered and a fuel cell is warmed up.

To solve the above-mentioned problem, a fuel cell system according to the present invention is characterized by comprising: a fuel cell; a load which operates owing to a power of the fuel cell; a first voltage conversion device which is provided between the fuel cell and the load and which converts an output of the fuel cell into a voltage to supply the voltage to the load; operation control means for operating the fuel cell at a low-efficiency operation point having a power loss larger than that of a usual operation point in a case where predetermined conditions are satisfied; and voltage conversion control means for controlling a voltage converting operation of the first voltage conversion device based on the operation point of the fuel cell and a driving voltage of the load.

According to such a constitution, even in a case where the fuel cell is operated at the low-efficiency operation point to recover a poisoned electrode catalyst and warm up the fuel cell, the voltage converting operation of the voltage conversion device is controlled based on the operation point of the fuel cell and the driving voltage of the load. Therefore, the load can constantly stably be operated regardless of the operation point of the fuel cell.

Here, in the above constitution, a configuration is preferable in which the first voltage conversion device is a booster converter to raise a terminal voltage of the fuel cell, and the voltage conversion control means allows the booster converter to raise the terminal voltage of the fuel cell corresponding to the operation point to at least the driving voltage of the load.

Moreover, a configuration is preferable in which when a warm-up operation of the fuel cell is required or an operation of recovering a catalyst activity of the fuel cell is required, the fuel cell is operated at the low-efficiency operation point.

Furthermore, a configuration is preferable which further comprises bypass means for bypassing the booster converter to supply an output current of the fuel cell to the load, while the fuel cell operates at the usual operation point. Here, the bypass means may be a diode in which an anode is connected to an input side of the booster converter and in which a cathode is connected to an output side of the booster converter.

Moreover, in the above constitution, a configuration is preferable which further comprises a chargeable/dischargeable power accumulation device; and a second voltage conversion device which converts the voltage between the power accumulation device and the load. Here, the second voltage conversion device is preferably a booster converter which raises a discharge voltage of the power accumulation device, or a converter which raises or lowers the discharge voltage.

As described above, according to the present invention, even in a case where a poisoned electrode catalyst is recovered and a fuel cell is warmed up, auxiliary devices to be driven with a high voltage can stably be operated.

BEST MODE FOR CARRYING OUT THE INVENTION

Embodiments according to the present invention will hereinafter be described with reference to the drawings.

A. First Embodiment

Figure 1:
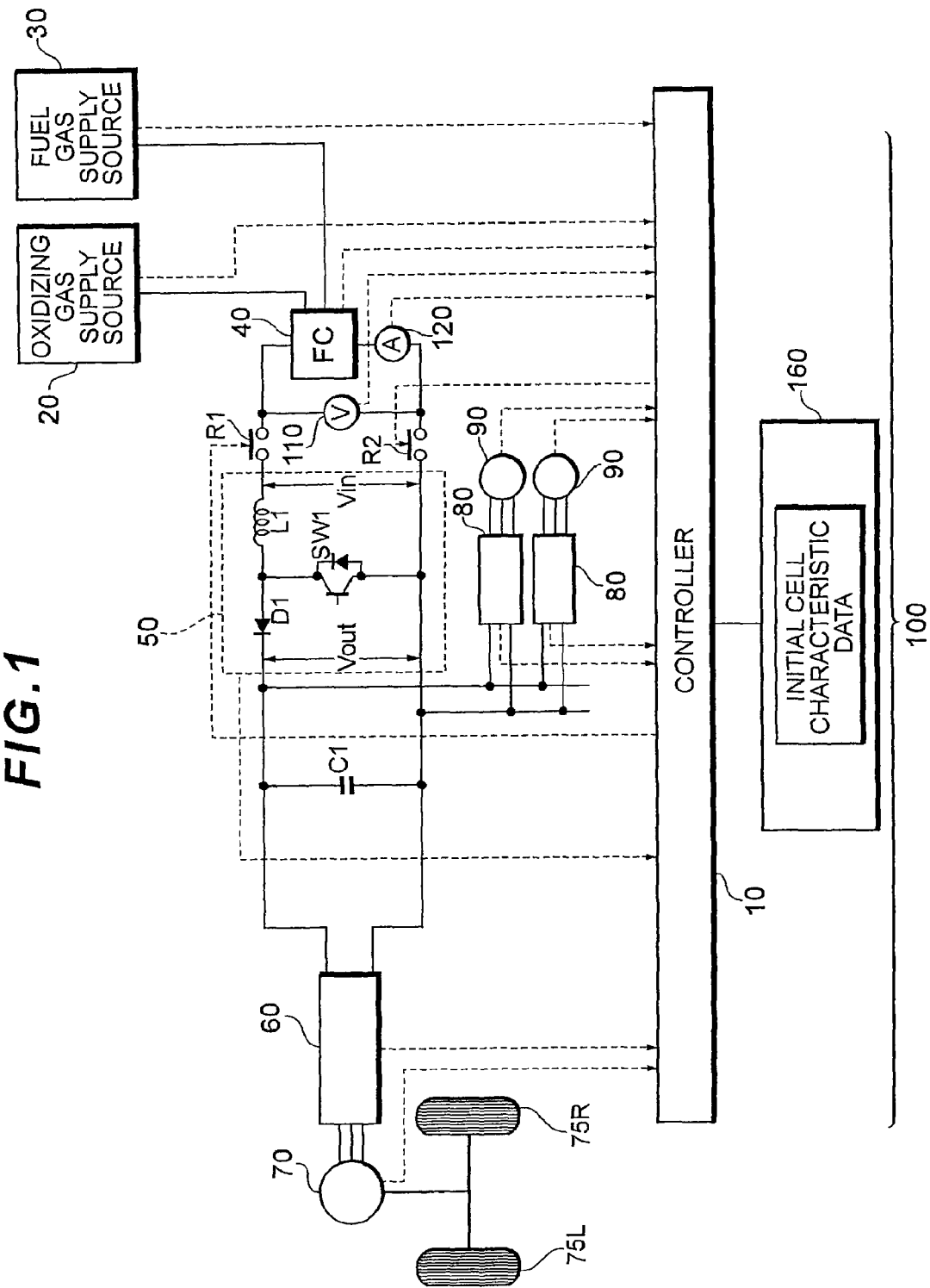
FIG. 1 is a diagram showing a constitution of a main part of a fuel cell system according to a first embodiment.

FIG. 1 is a diagram showing a constitution of a main part of a fuel cell system 100 according to a first embodiment. The fuel cell system 100 is a vehicle system on which a fuel cell 40 is mounted as a power source, and is characterized in that a booster converter 50 is connected between an output end of the fuel cell 40 and a load. It is to be noted that in the present embodiment, a fuel cell system is assumed which is to be mounted on a fuel cell hybrid vehicle (FCHV), but the system is applicable to not only vehicles such as an electric car and a hybrid car but also various mobile bodies (e.g., a ship, an airplane, a robot, etc.) and a stationary power source.

An oxidizing gas supply source 20 is constituted of, for example, an air compressor, a motor which drives the air compressor, an inverter and the like, and a rotation number of the motor and the like are adjusted to adjust an amount of an oxidizing gas to be supplied to the fuel cell 40.

A fuel gas supply source 30 is constituted of, for example, a hydrogen tank, various valves and the like, and valve open degrees, ON/OFF time and the like are adjusted to control an amount of a fuel gas to be supplied to the fuel cell 40.

The fuel cell 40 is means for generating a power from a reactive gas (the fuel gas and the oxidizing gas) to be supplied, and a fuel cell of any type such as a solid polymer type, a phosphate type or a dissolving carbonate type can be used. The fuel cell 40 has a stack structure in which a plurality of unitary cells including an MEA and the like are laminated in series. A terminal voltage (hereinafter referred to as the FC voltage) and an output current (hereinafter referred to as the FC current) of this fuel cell 40 are detected by a voltage sensor 110 and a current sensor 120, respectively. A fuel gas such as a hydrogen gas is supplied from the fuel gas supply source 30 to a fuel pole (an anode) of the fuel cell 40, whereas an oxidizing gas such as air is supplied from the oxidizing gas supply source 20 to an oxygen pole (a cathode). The FC voltage of this fuel cell 40 is supplied to the booster converter 50 via connection relays R1, R2. The connection relays R1, R2 are controlled to turn ON/OFF based on a switch signal to be supplied from a controller 40.

The booster converter (a first voltage conversion device) 50 raises the FC voltage supplied from the fuel cell 40 to a system required voltage (a driving voltage of the load) under control of the controller 10, to supply the voltage to inverters 60, 80. It is to be noted that in the following description, the voltage input into the booster converter 50 before raised will be referred to as an input voltage Vin, and the raised voltage output from the booster converter 50 will be referred to as an output voltage Vout.

This booster converter 50 includes a reactor L1, a diode D1 for rectification, and a switching element SW1 including an IGBT and the like. One end of the reactor L1 is connected to the connection relay R1, and the other end thereof is connected to a collector of the switching element SW1. The switching element SW1 is connected between power lines and earth lines of the inverters 60, 80. Specifically, the collector of the switching element SW1 is connected to the power lines, and an emitter thereof is connected to the earth lines. In such a constitution, when the switch SW1 is first turned ON, a current flows to the fuel cell 40→the inductor L1→the switch SW1. At this time the reactor L1 is excited with a direct current to accumulate magnetic energy.

Subsequently, when the switch SW1 is turned OFF, an induced voltage due to the magnetic energy accumulated in the inductor L1 is superimposed on the FC voltage (the input voltage Vin) of the fuel cell 40 to output an operation voltage (the output voltage Vout) higher than the input voltage Vin from the inductor L1, and the output current is output via the diode D1. The controller 10 appropriately changes an ON/OFF duty (described later) of this switch SW1 to obtain a desired output voltage Vout.

Each of the inverters 60, 80 is, for example, a PWM inverter of a pulse width modulation system, and converts a direct-current power supplied from the booster converter 50 into a three-phase alternate-current power based on a control command given from the controller 80, to supply the power to motors 70, 90.

In more detail, the inverter 60 converts, into the three-phase alternate-current power, the direct-current power supplied from the booster converter 50 via a capacitor C1, to supply the power to the traction motor 70. The traction motor 70 is a motor (i.e., a power source of a mobile body) to drive wheels 75L, 75R, and the rotation number of such a motor is controlled by the inverter 60. It is to be noted that the capacitor C1 smoothens the direct-current voltage supplied from the booster converter 50 to supply the voltage to the inverter 60.

On the other hand, the inverter 80 converts the direct-current voltage supplied from the booster converter 50 into the three-phase alternate-current power to supply the power to auxiliary devices 90. The auxiliary devices 90 are constituted of a vehicle auxiliary device, an FC auxiliary device and the like. It is to be noted that the vehicle auxiliary device is any type of power device for use in operating a vehicle and the like (a light, an air conditioner, a hydraulic pump, etc.), and the FC auxiliary device is any type of power device for use in operating the fuel cell 40 (pumps for supplying the fuel gas and the oxidizing gas, etc.).

The controller (operation control means, voltage conversion control means) 10 is constituted of a CPU, an ROM, an RAM and the like, and system sections are centrically controlled based on sensor signals input from the voltage sensor 110 and the current sensor 120, a temperature sensor which detects a temperature of the fuel cell 40, an accelerator pedal sensor which detects an open degree of an accelerator pedal and the like.

Moreover, the controller 10 detects by the following method whether or not an electrode catalyst of the fuel cell 40 is poisoned, and performs processing to switch an operation point of the fuel cell 40 so as to recover characteristics of the poisoned electrode catalyst (described later).

A memory 160 is, for example, a rewritable nonvolatile memory in which initial cell characteristic data indicating cell characteristics in an initial state (e.g., during shipping of a manufactured cell) of the fuel cell 40 and the like are stored. The initial cell characteristic data is a two-dimensional map showing a relation between a current density and a voltage of the fuel cell 40 in the initial state, and the voltage lowers as the current density increases.

As is known, when the electrode catalyst of the fuel cell 40 is poisoned, the cell characteristics lower. With the equal voltage, the current density after poisoning decreases as compared with that before the poisoning (the current density indicated by the initial cell characteristic data). In the present embodiment, the FC voltage and the FC current detected by the voltage sensor 110 and the current sensor 120 are compared with the initial cell characteristic data by use of the above-mentioned characteristics, to detect whether or not the electrode catalyst is poisoned. More specifically, when the voltage sensor 110 and the current sensor 120 detect the FC voltage and the FC current, the controller (detection means) 10 compares the detection result with the current density at the equal voltage in the initial cell characteristic data. As a result of such comparison, when the following formulas (1), (2) are established, it is judged that the electrode catalyst is poisoned. On the other hand, when the following formulas (1), (2) are not established, it is judged that the electrode catalyst is not poisoned.

$$Vfc=Vs \quad (1), \text{ and}$$

$$Ifc<Is+\alpha \quad (2),$$

in which Vfc; an FC voltage,
Vs; a voltage in the initial cell characteristic data,
Ifc; an FC current,
Is; a current density in the initial cell characteristic data, and
α; a predetermined value.

It is to be noted that in the above description, it is detected using the initial cell characteristic data whether or not the electrode catalyst is poisoned, but needless to say, it may be detected by another method whether or not the electrode catalyst is poisoned. For example, when the electrode catalyst is poisoned by carbon monoxide, a known CO concentration sensor is provided, and a relation between a CO concentration and a measured voltage value may beforehand be inspected and mapped to detect, based on the detected CO concentration or the like, whether or not the electrode catalyst is poisoned. The operation point of the fuel cell 40 will hereinafter be described with reference to the drawing.

Figure 2A:
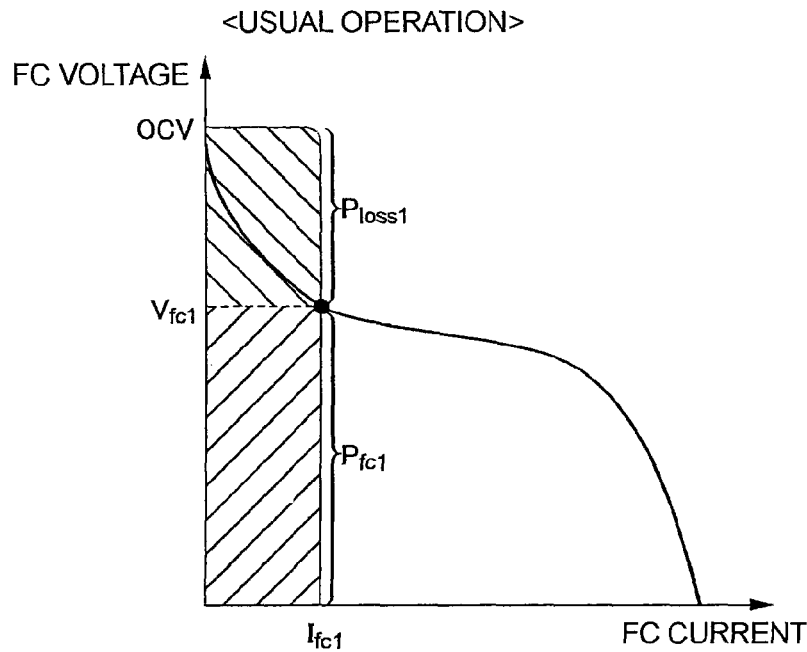
FIG. 2A is a diagram showing a relation between an output power and a power loss according to the embodiment.
Figure 2B:
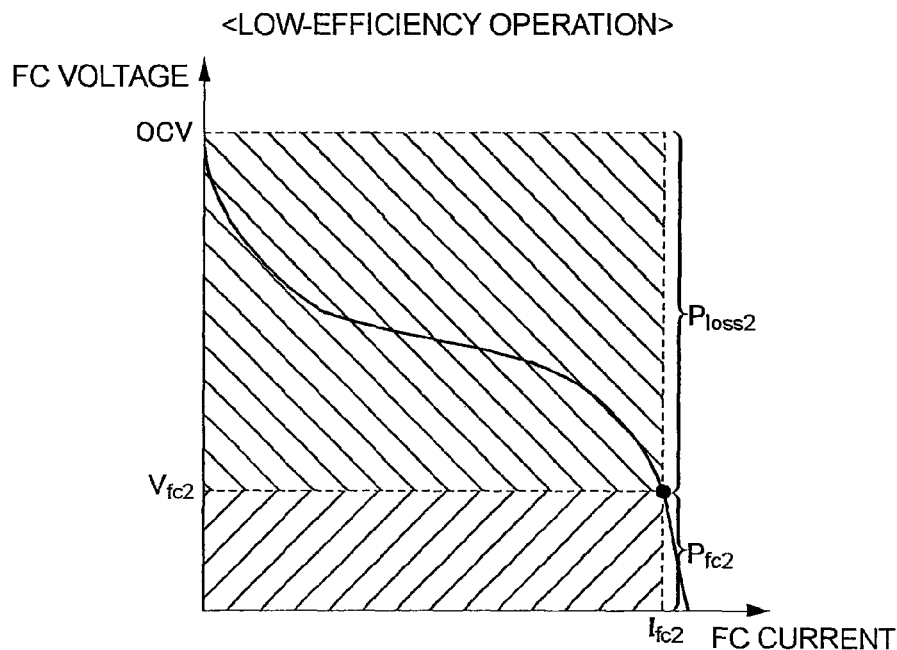
FIG. 2B is a diagram showing a relation between the output power and the power loss according to the embodiment.

FIGS. 2A and 2B are diagrams showing a relation between an output power and a power loss at a time when the fuel cell is operated at different operation points. The abscissa indicates the FC current and the ordinate indicates the FC voltage. Moreover, an open circuit voltage (OCV) shown in FIGS. 2A and 2B is a voltage in a state in which any current is not circulated through the fuel cell.

The fuel cell 40 capable of obtaining the current and voltage characteristics (hereinafter referred to as the IV characteristic) shown in FIGS. 2A and 2B is usually operated at an operation point (Ifc1, Vfc1) at which the power loss is small with respect to the output power (see FIG. 2A). However, when the electrode catalyst of the fuel cell 40 is poisoned, an inner temperature of the fuel cell 40 needs to be raised to recover an activity of the electrode catalyst. Therefore, in the present embodiment, the operation of the fuel cell shifts to an operation point (Ifc2, Vfc2) having a large power loss while securing a necessary output power, thereby recovering the activity of the poisoned electrode catalyst (see FIG. 2B). Here, output powers Pfc at the operation points shown in FIGS. 2A and 2B, a power loss Ploss, a relation between the output voltages Pfc and a relation between the power losses Ploss are as follows.

<Concerning the Operation Point (Ifc, Vfc1)>

$$Ifc1*Vfc1=Pfc1 \quad (3)$$

$$Ifc1*OCV-Pfc1=Ploss1 \quad (4)$$

<Concerning the Operation Point (Ifc2, Vfc2)>

$$Ifc2*Vfc2=Pfc2 \quad (5)$$

$$Ifc2*OCV-Pfc2=Ploss2 \quad (6)$$

<Relations Between the Output Powers and Between the Power Losses>

$$Pfc1=Pfc2 \quad (7)$$

$$Ploss1<Ploss2 \quad (8)$$

Figure 3:
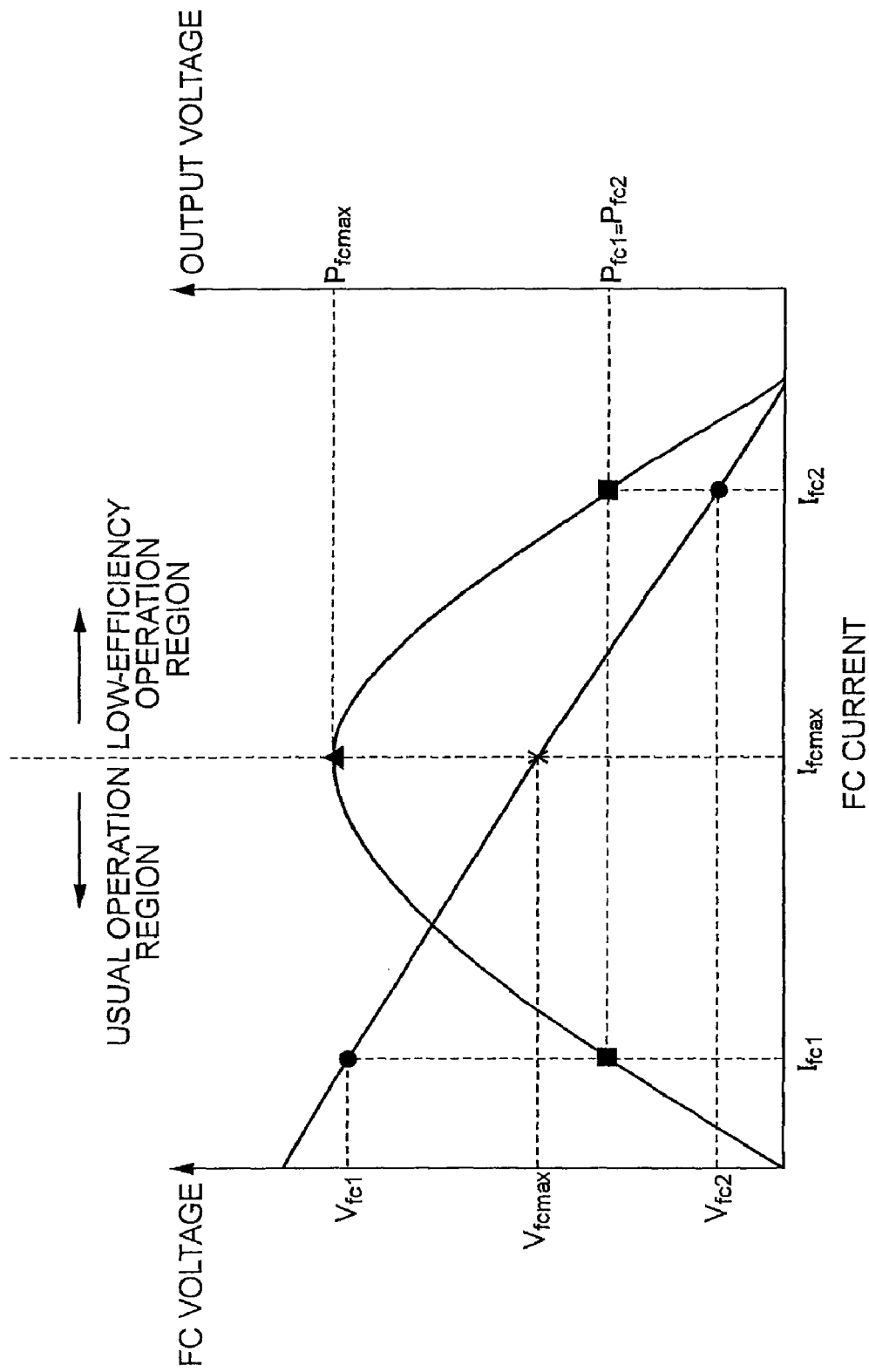
FIG. 3 is a diagram showing changes of the output power according to the embodiment.

FIG. 3 is a diagram showing changes of the output power at a time when the fuel cell is operated while the operation point is shifted. The abscissa indicates the FC current, and the ordinate indicates the FC voltage and the output power. It is to be noted that in FIG. 3, for the sake of convenience, the IV characteristic of the fuel cell is shown with a straight line (hereinafter referred to as the IV line). Operation points (Ifc1, Vfc1), (Ifc2, Vfc2) on the IV line correspond to the operation points (Ifc1, Vfc1), (Ifc2, Vfc2) shown in FIG. 2.

As shown in FIG. 3, with regard to the output power Pfc of the fuel cell 40, as the FC voltage Vfc decreases, the output power Pfc increases at an operation point on the IV line shown on the left side of a maximum output operation point (Ifcmax, Vfcmax) at which a maximum output power Pfcmax is obtained. On the other hand, at an operation point on the IV line shown on the right side of the maximum output operation point, the output power Pfc decreases, as the FC voltage Vfc decreases.

As described above, the power loss Ploss increases, as the FC voltage Vfc decreases. Therefore, even when the fuel cell 40 is operated to output the equal power, the power loss Ploss is large in a case where the fuel cell is operated at the operation point on the IV line shown on the right side of the maximum output operation point (e.g., the operation point (Ifc1, Vfc1)) as compared with a case where the fuel cell is operated at the operation point on the IV line shown on the left side of the maximum output operation point (e.g., the operation point (Ifc2, Vfc2)). Therefore, in the following description, the operation point on the IV line at which the output power Pfc increases with the decrease of the FC voltage Vfc defined as a usual operation point, and the operation point on the IV line at which the output power Pfc decreases with the decrease of the FC voltage Vfc is defined as a low-efficiency operation point. It is to be noted that the usual operation point and the low-efficiency operation point are as follows.

<Concerning the Usual Operation Point (Ifc, Vfc)>

$$Ifc \leq Ifcmax \quad (9)$$

$$Vfcmax \leq Vfc \quad (10)$$

<Concerning the Low-Efficiency Operation Point (Ifc, Vfc)>

$$Ifcmax<Ifc \quad (11)$$

$$Vfc<Vfcmax \quad (12)$$

Next, the operation point shift processing to be executed by the controller 80 will be described with reference to FIGS. 4 and 5.

Figure 4:
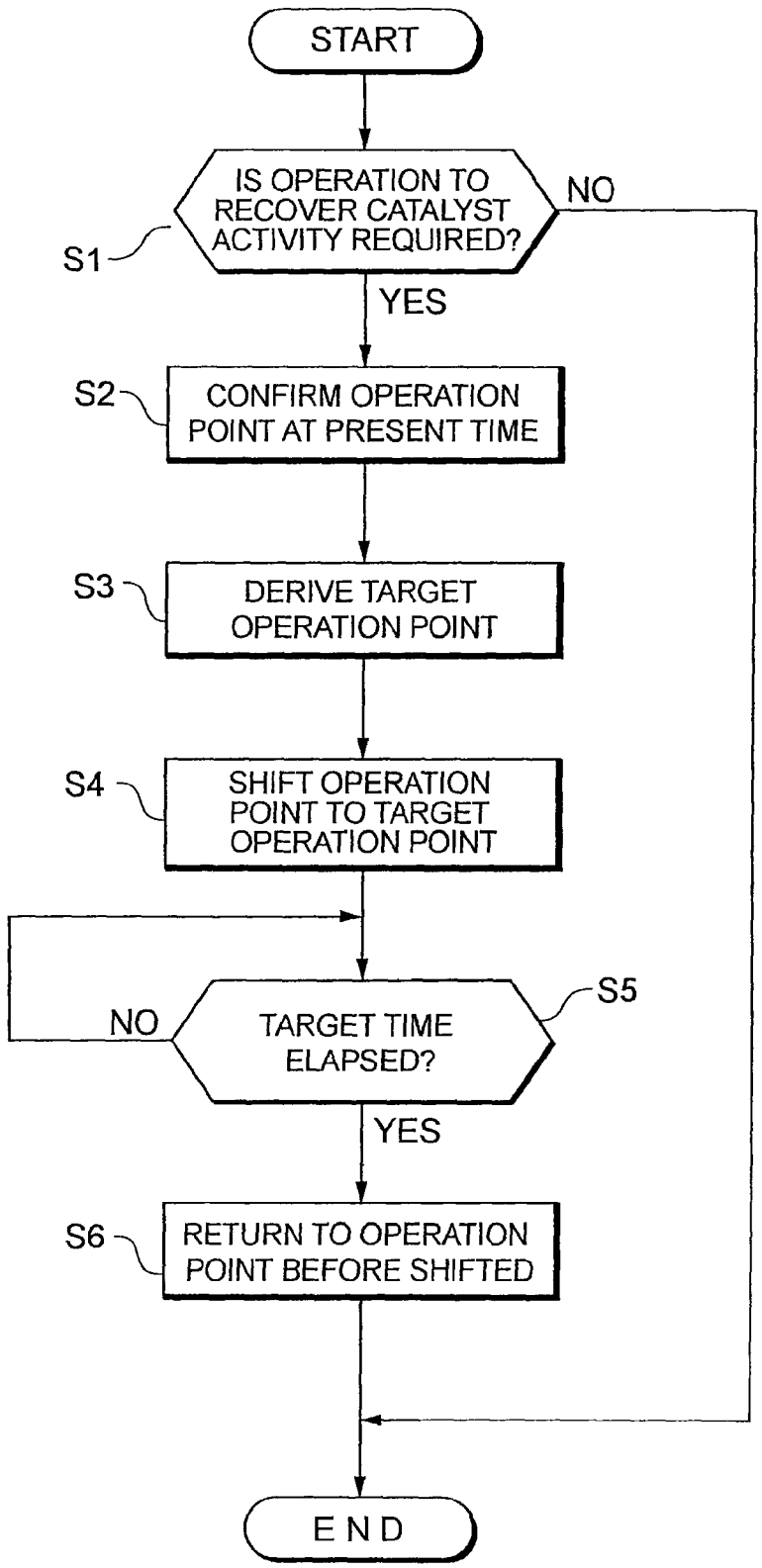
FIG. 4 is a flow chart showing shift processing of an operation point according to the embodiment.
Figure 5A:
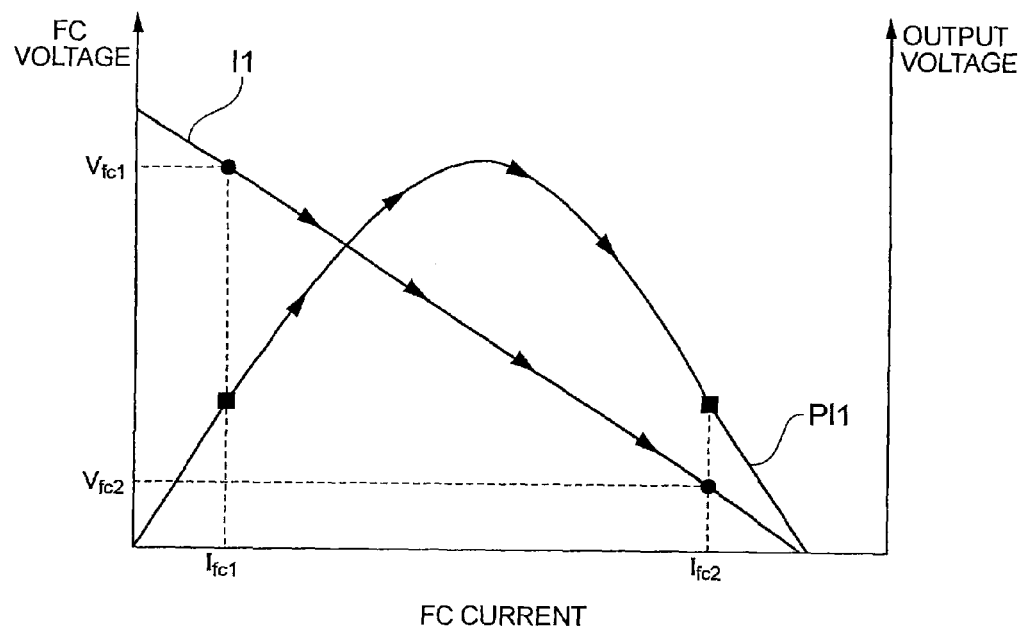
FIG. 5A is a diagram showing changes of the output power according to the embodiment.
Figure 5B:
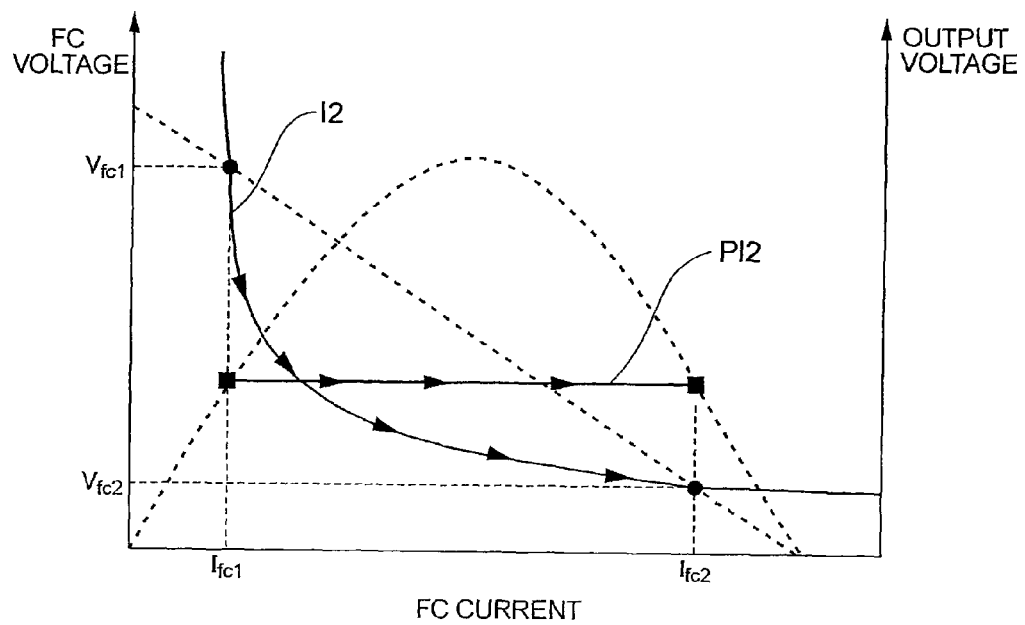
FIG. 5B is a diagram showing changes of the output power according to the embodiment.

FIG. 4 is a flow chart showing the shift processing of the operation point, and FIG. 5 shows diagrams of changes of the output power at a time when the operation point is shifted. It is to be noted that in the following description, it is assumed a case where the operation point of the fuel cell 40 is shifted from the usual operation point (Ifc1, Vfc1) to the low-efficiency operation point (Ifc2, Vfc2) in order to recover the activity of the poisoned electrode catalyst (see FIGS. 5A and 5B). In the following description, devices which consume the power output from the booster converter 50, for example, the inverters 60, 80, the traction motor 70, the auxiliary devices 90 and the like connected to the booster converter 50 will generically be referred to as loads.

The controller 10 first judges whether or not an operation to recover the catalyst activity is required (step S1). Specifically, the FC voltage and the FC current detected by the voltage sensor 110 and the current sensor 120 are compared with the initial cell characteristic data to detect whether or not the electrode catalyst is poisoned. When the electrode catalyst is not poisoned, it is judged that the operation to recover the catalyst activity is not required. On the other hand, when the electrode catalyst is poisoned, it is judged that the operation to recover the catalyst activity is required.

When the electrode catalyst is not poisoned, the controller (the operation control means) 10 continues operating at the usual operation point based on the driving power of the load (a system required power). More specifically, the controller (the voltage conversion control means) 10 grasps the system required power, and then determines the usual operation point (Ifc1, Vfc1) corresponding to the system required power with respect to a power-operation point correspondence map (not shown) stored in the memory 160 or the like, to perform the operation at the determined usual operation point. Here, during the operation at the usual operation point, the operation of the booster converter 50 is stopped (the switching element SW1; "OFF"), so that the input voltage Vin and output voltage Vout of the booster converter 50 become equal. For example, when a system required voltage Vreq is 350 V, the controller 10 sets Vfc1 of the usual operation point corresponding to the system required power to 350 V. During the operation at the usual operation point, the operation of the booster converter 50 is stopped, so that Vfc1=Vin=Vout=350 V results.

On the other hand, when the electrode catalyst is poisoned, the controller 10 confirms the operation point (here, the usual operation point (Ifc1, Vfc1)) at the present time (step S2), then derives an adequate operation point (a target operation point) of the fuel cell 40 so as to recover the activity of the poisoned electrode catalyst (step S3). One example will be described. For example, when the fuel cell is operated at the usual operation point (Ifc1, Vfc1) to obtain the output power Pfc1, the low-efficiency operation point (Ifc2, Vfc2) capable of obtaining the output power Pfc2 (=Pfc1) equal to the above output power is derived as the target operation point.

It is to be noted that in the poisoned electrode catalyst, a cell voltage of the fuel cell 40 is controlled into 0.6 V or less, whereby a catalyst reducing reaction occurs to recover the catalyst activity. Therefore, the operation point which satisfies such conditions may be derived as the target operation point (details will be described later).

Then, the controller (the operation control means) 10 starts shift of the operation point toward the target operation point (step S4). Here, in a case where the only FC voltage is controlled to shift the operation point from the usual operation point (Ifc1, Vfc1) to the low-efficiency operation point (Ifc2, Vfc2), as shown in FIG. 5A, the output power of the fuel cell 40 largely fluctuates in response to the shift of the operation point of an IV line l1 (see a power line pl1).

More specifically, in a case where the only FC voltage is controlled using the booster converter 50 to shift the operation point, in a shift process, there occurs necessity of performing a high-output operation (an operation at the maximum output operation point or the like) which might not be performed under a usual use environment.

To solve the problem, in the present embodiment, as shown in FIG. 5B, the FC current is controlled together with the FC voltage to realize the shift of the operation point from the usual operation point (Ifc1, Vfc1) to the low-efficiency efficiency operation point (Ifc2, Vfc2) so that the output power is kept constant (see a power line pl2). Specifically, the FC voltage is lowered from Vfc1 to Vfc2 by use of the booster converter (the first voltage conversion device, a voltage conversion device) 50, and the controller (adjustment means, change means) 10 adjusts an amount of the oxidizing gas to be supplied from the oxidizing gas supply source 20 (here, reduces the amount of the oxidizing gas), to control the FC current.

The control of the FC voltage will be described in more detail. For example, when the system required voltage Vreq is 350 V, the controller 10 sets Vfc2 of the low-efficiency operation point to 30 V. Then, the controller (the voltage conversion control means) 10 controls an operation (the duty) of the booster converter 50 so as to satisfy Vfc2=Vin=30 V while satisfying Vreq=Vout=350 V. It is to be noted that the duty of the booster converter 50 can be represented as follows.

$$\text{Duty}=(V\text{out}-V\text{in})/V\text{out} \quad (13)$$

When the operation point is shifted as described above, the controller 10 judges with reference to a timer (not shown) or the like whether or not a target set time has elapsed since the operation point was shifted (step S5). Here, the target set time is time (e.g., 10 seconds) adequate for recovering the activity of the electrode catalyst, which has elapsed since the operation was started at the low-efficiency operation point, and can be obtained in advance by an experiment or the like. On judging that the target set time has not elapsed (step S5; NO), the controller 10 repeatedly executes the step S5. On the other hand, on judging that the target set time has elapsed (step S5; YES), the controller 10 returns the shifted operation point to the operation point before shifted (step S6), thereby ending the processing.

As described above, according to the fuel cell system of the present embodiment, even when the poisoned electrode catalyst is recovered, the auxiliary devices driven at the high voltage and the like can stably be operated.

It is to be noted that as described above, with regard to the poisoned electrode catalyst, the cell voltage of the fuel cell 40 is controlled into 0.6 V or less to recover the catalyst activity, so that the operation point may be derived as follows.

For example, in a case where the fuel cell 40 has a stack structure in which 300 cells are laminated and a system required power is 1 kW, if the cell voltage is set to 0.5 V (<0.6 V), the target operation point is as follows.

<Concerning the Target Operation Point (Ifc, Vfc)>

$$V\!f\!c=300*0.5=150\text{ V} \quad (14)$$

$$I\!f\!c=1000/150=6.7\text{ A} \quad (15)$$

Here, even in a case where the obtained target operation point is not present on the IV line before shifted, the FC current is controlled together with the FC voltage to change the IV characteristic, whereby the obtained target operation point can be positioned on the IV line.

<Modification>

(1) In the above embodiment, the amount of the oxidizing gas to be supplied from the oxidizing gas supply source 20 is adjusted to control the FC current. However, an amount of a fuel gas to be supplied from a fuel gas supply source 30 may be adjusted to control the FC current.

(2) In the above embodiment, in a case where it is detected that the electrode catalyst is poisoned, the operation point of the fuel cell 40 is shifted from the usual operation point to the low-efficiency operation point, but the operation point may be shifted at the following timing.

For example, a fuel cell may be operated once at a low-efficiency operation point during actuation of a system, and then the operation point may be shifted to a usual operation point to perform a system operation in a state in which a catalyst activity is constantly raised. When a system required power is a predetermined value or less (e.g., around an idle output or the like), the operation point may be shifted from the usual operation point to the low-efficiency operation point. Furthermore, after the system stops, the operation may be performed at the low-efficiency operation point to recover the deteriorated catalyst activity during the operation in preparation for the next actuation.

(3) In the above embodiment, it is constituted that the operation point of the fuel cell 40 is shifted from the usual operation point to the low-efficiency operation point in order to recover the activity of the poisoned electrode catalyst, but the present invention is applicable to any case that requires a warm-up operation, for example, a case where the warm-up operation is performed during the actuation at a low temperature, a case where the warm-up operation is rapidly performed before the stop of the system operation and the like.

One example will be described. On receiving an actuation command of the system from an operation switch or the like, a controller 10 detects an inner temperature of a fuel cell 40 by use of a temperature sensor (not shown). The controller (operation control means) 10 judges that the warm-up operation is required in a case where the inner temperature of the fuel cell 40 is below a preset threshold temperature, and the shift processing of the operation point shown in FIG. 4 is executed. The subsequent operation is similar to that of the present embodiment, and hence description thereof is omitted. It is to be noted that instead of the temperature sensor, a temperature sensor to detect an outside air temperature, a temperature sensor to detect a temperature of a refrigerant flowing through a cooling mechanism (not shown) or the like may be used.

B. Second Embodiment

Figure 6:
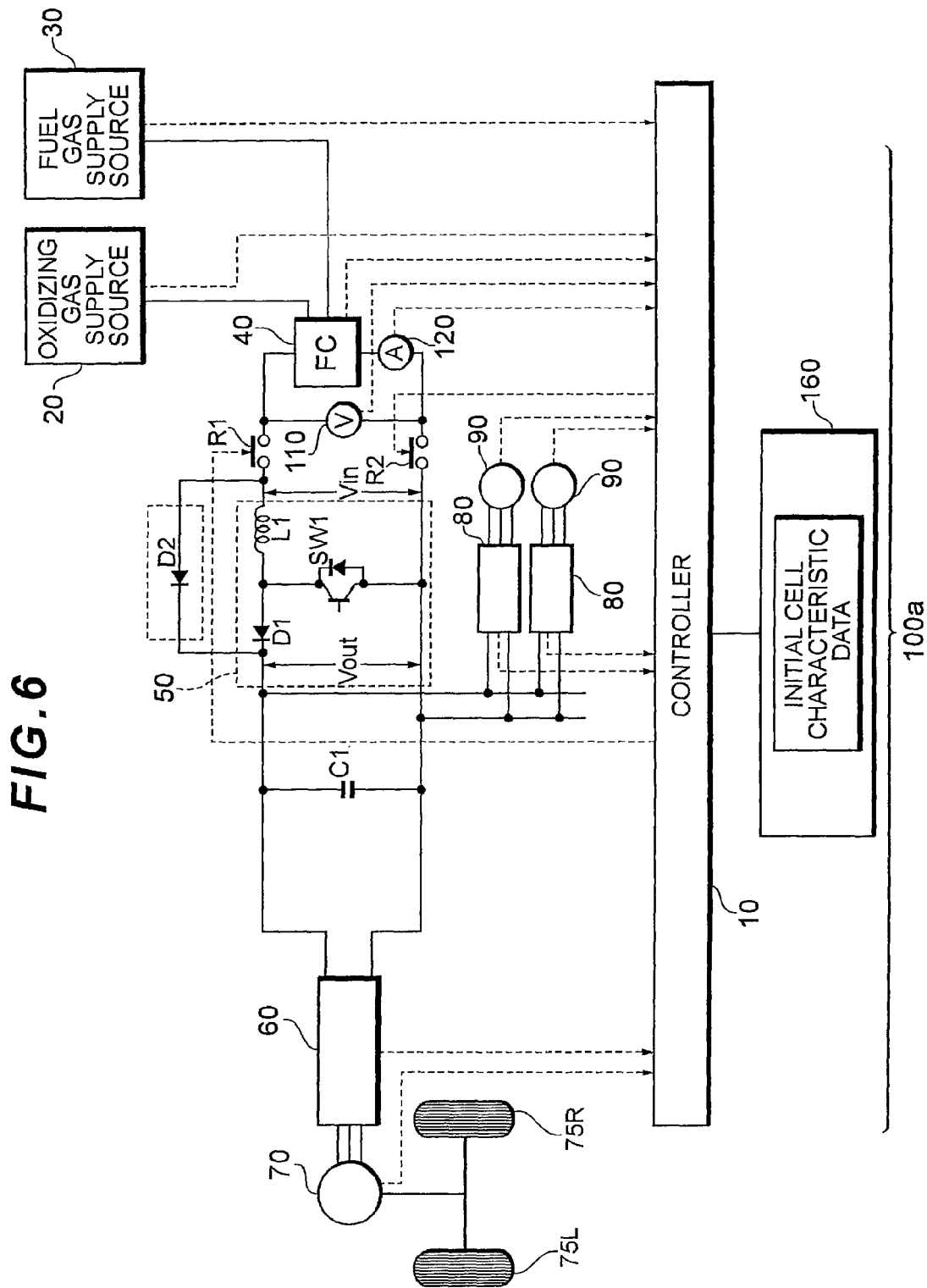
FIG. 6 is a diagram showing a constitution of a main part of a fuel cell system according to a second embodiment.

FIG. 6 is a diagram showing a constitution of a main part of a fuel cell system 100a according to a second embodiment. It is to be noted that components corresponding to those of the fuel cell system 100 shown in FIG. 1 are denoted with the same reference numerals, and detailed description thereof is omitted.

As shown in FIG. 6, the fuel cell system 100a is provided with a diode (bypass means) D2 for canceling a steady loss due to a direct-current resistance of a reactor L1. In the diode D2, an anode is connected to a previous stage of the reactor L1 (an input side of a booster converter), whereas a cathode is connected to a subsequent stage of a diode D1 (an output side of the booster converter).

The diode D2 is thus provided for the following reason. That is, when an operation of a booster converter 50 is stopped (a switching element SW1: "OFF") during an operation at a usual operation point, an FC current flows through the reactor L1→the diode D1, and the steady loss due to the direct-current resistance of the reactor L1 raises a problem (see FIG. 1). To solve the problem of the steady loss due to this direct-current resistance of the reactor L1, the diode D2 is provided (see FIG. 6). As a result, during the operation at the usual operation point, the FC current bypasses the booster converter 50 to flow through the diode D2→a load. On the other hand, during an operation at a low-efficiency operation point, the FC current flows through the reactor L1→the diode D1→the load, and the steady loss due to the direct-current resistance of the reactor L1 can be canceled.

In the first and second embodiments described above, a power source system including the fuel cell 40 only has been described. However, in third and fourth embodiments described below, a hybrid power source system including the fuel cell 40 and a battery 80 will be described.

C. Third Embodiment

Figure 7:
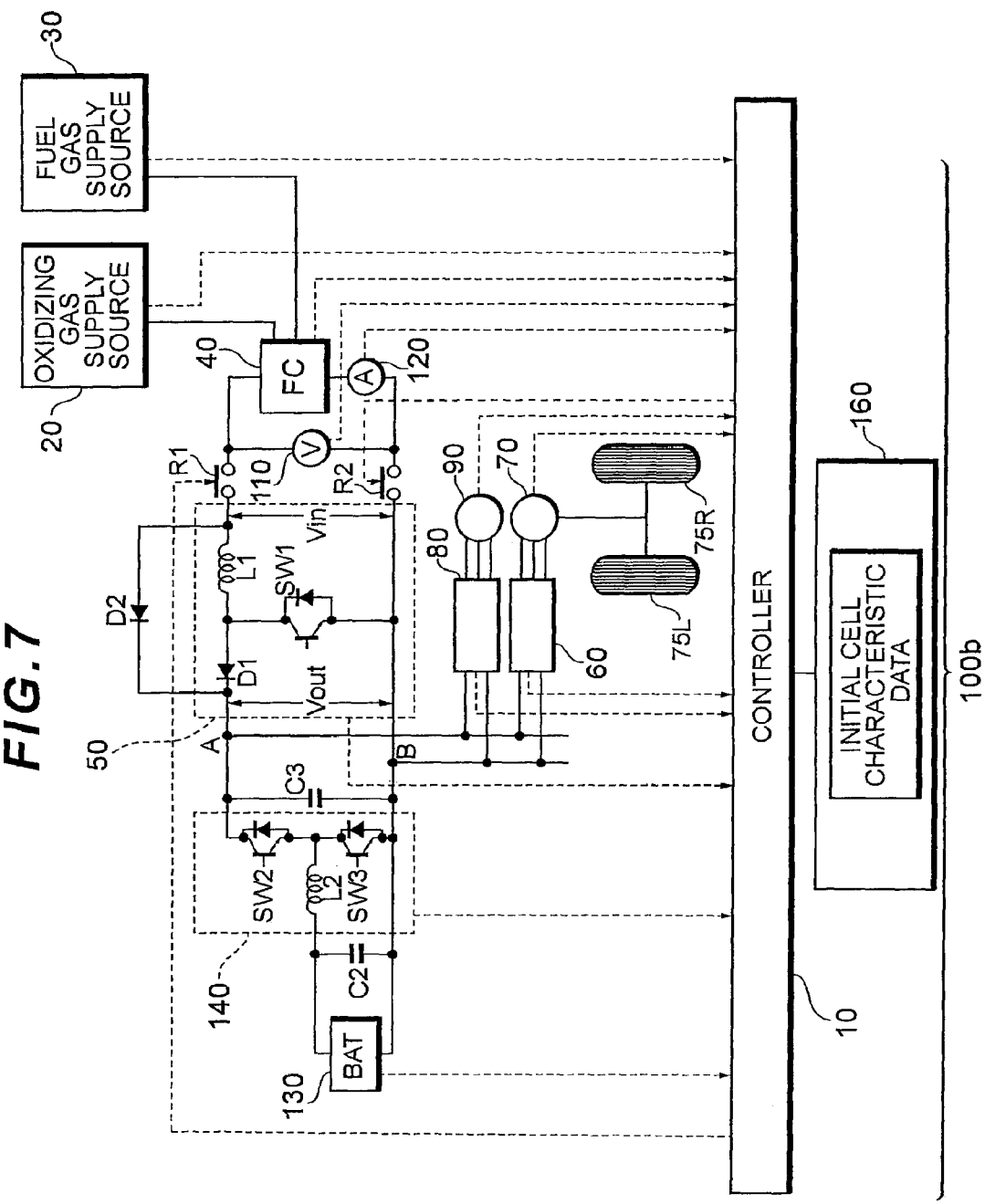
FIG. 7 is a diagram showing a constitution of a main part of a fuel cell system according to a third embodiment.

FIG. 7 is a diagram showing a constitution of a main part of a fuel cell system 100b according to a third embodiment. It is to be noted that components corresponding to those of the fuel cell system 100a shown in FIG. 6 are denoted with the same reference numerals, and detailed description thereof is omitted.

As shown in FIG. 7, on the fuel cell system 100a, a power source system including a fuel cell 40 and a booster converter 50, and a power source system including a battery 130 and a booster converter 140 are mounted.

The battery (a power accumulation device) 130 is a chargeable/dischargeable secondary cell, and constituted of, for example, a nickel hydrogen battery or the like. Needless to say, instead of the battery 130, a chargeable/dischargeable accumulator (e.g., a capacitor) may be provided except a secondary cell. The battery 130 is connected to a load via the booster converter 140. However, it is assumed that a discharge voltage Vba of the battery 130 is lower than a system required voltage Vreq. For example, in a case where the system required voltage fluctuates from 300 to 350 V, the battery 130 is limited to a battery in which the discharge voltage Vba is 300 V or less (e.g., 200 to 299 V).

The booster converter (a second voltage conversion device) 140 raises the discharge voltage Vba supplied from the battery 130 to the system required voltage (a voltage between A and B shown in FIG. 7) under control of a controller 10, to supply the voltage to inverters 60, 80. For example, when the system required voltage Vreq is set to 350 V and the discharge voltage Vba of the battery 130 is set to 250 V, the controller 10 controls a duty of the booster converter 140, whereby the discharge voltage Vba (=250 V) is raised to the system required voltage (=350 V).

This booster converter 50 includes a reactor L2, and switching elements SW2, SW3 including an IGBT and the like. One end of the reactor L1 is connected to a power line of the battery 130, and the other end thereof is connected between an emitter of the switching element SW2 and a collector of the switching element SW3.

The switching elements SW2, SW3 are connected in series between the power line and the earth line on an inverter side. A collector of the switching element SW2 is connected to the power line, and an emitter of the switching element SW3 is connected to the earth line.

A capacitor C2 smoothens a direct-current voltage supplied from the battery 130 to supply the voltage to the booster converter 140, whereas a capacitor C3 smoothens a direct-current voltage supplied from the booster converter 140 to supply the voltage to the inverters 60, 80. It is to be noted that a booster operation of the booster converter 140 is substantially similar to that of the first embodiment, and hence description thereof is omitted.

According to such a constitution, auxiliary devices driven at a high voltage and the like can stably be operated. In addition, the load can efficiently be driven using the fuel cell and the battery.

In the third embodiment described above, a case where the discharge voltage Vba of the battery 130 constantly does not overlap with the system required voltage, specifically a case where the discharge voltage Vba of the battery 130 is constantly below the system required voltage Vreq has been described, but in the following fourth embodiment, a case where the discharge voltage Vba of the battery 130 overlaps with the system required voltage Vreq will be described.

D. Fourth Embodiment

Figure 8:
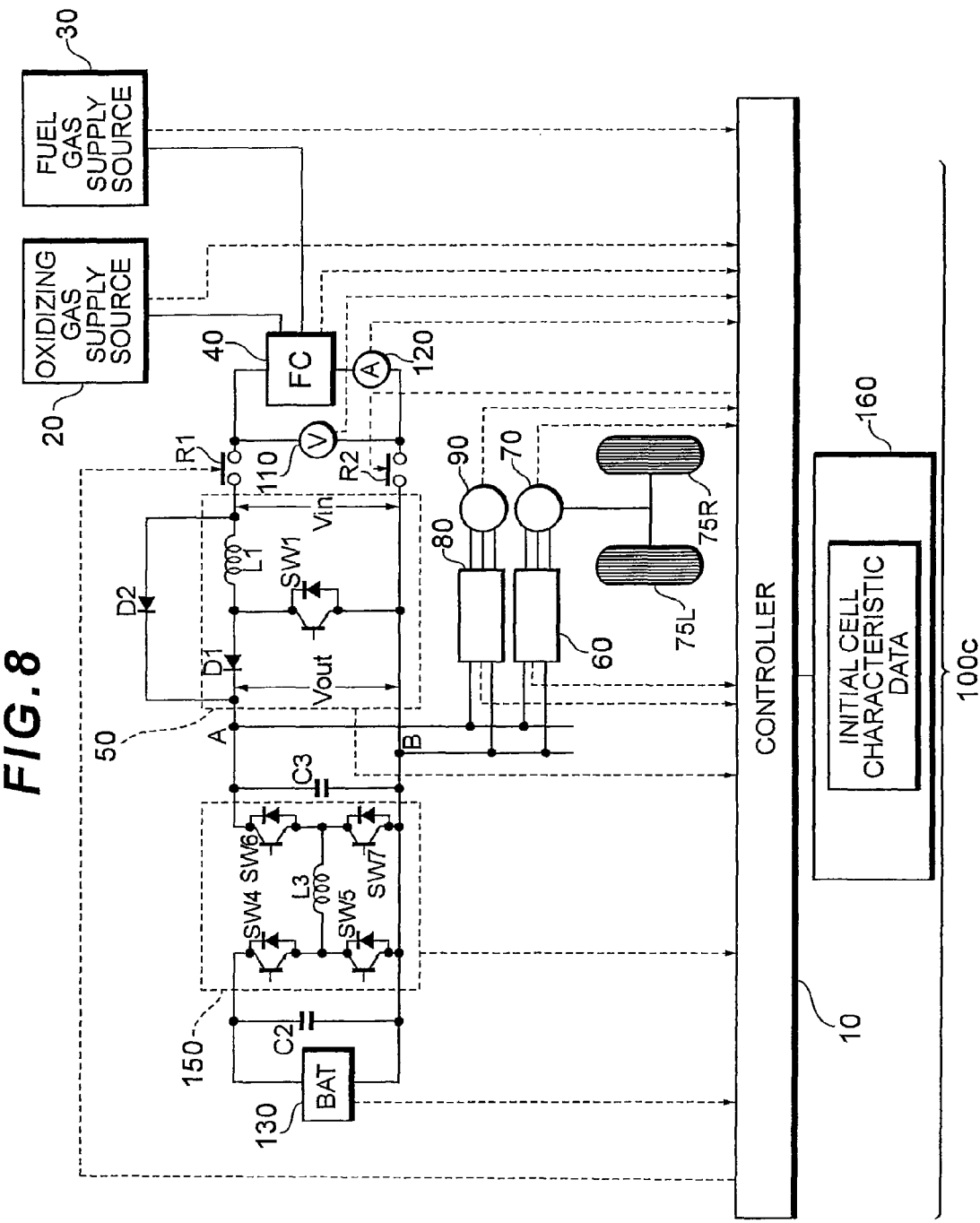
FIG. 8 is a diagram showing a constitution of a main part of a fuel cell system according to a fourth embodiment.

FIG. 8 is a diagram showing a constitution of a main part of a fuel cell system 100c according to a third embodiment. It is to be noted that components corresponding to those of the fuel cell system 100b shown in FIG. 7 are denoted with the same reference numerals, and detailed description thereof is omitted.

As shown in FIG. 8, the fuel cell system 100c is provided with a converter (a second voltage conversion device) 150 instead of the booster converter 140 (see FIG. 7).

The converter 150 raises or lowers a discharge voltage Vba supplied from a battery 130 to a system required voltage (a voltage between A and B shown in FIG. 8) under control of a controller 10, to supply the voltage to inverters 60, 80. For example, when a system required voltage Vreq is set to 350 V and the discharge voltage Vba of the battery 130 is set to 300 V, the controller 10 controls a duty of the converter 150, whereby the discharge voltage Vba (=300 V) is raised to the system required voltage (=350 V). On the other hand, when the system required voltage Vreq is set to 250 V and the discharge voltage Vba of the battery 130 is set to 300 V, the controller 10 controls the duty of the converter 150, whereby the discharge voltage Vba (=300 V) is lowered to the system required voltage (=250 V). The duty of the converter 150 can be represented as follows.

$$Duty=Vout/(Vin+Vout) \quad (16)$$

This converter 150 is a full bridge converter including a reactor L3, and four switching elements SW4 to SW7 including an IGBT and the like. One end of the reactor L3 is connected between an emitter of the switching element SW4 and a collector of the switching element SW5, and the other end thereof is connected between an emitter of the switching element SW6 and a collector of the switching element SW7.

The switching elements SW4, SW5 are connected in series between a power line and an earth line on a battery side. A collector of the switching element SW4 is connected to the power line, and an emitter of the switching element SW5 is connected to the earth line. The switching elements SW6, SW7 are connected in series between a power line and an earth line on an inverter side. A collector of the switching element SW6 is connected to the power line, and an emitter of the switching element SW7 is connected to the earth line.

According to such a constitution, even when the discharge voltage of the battery overlaps with the system required voltage, a load can efficiently be driven.

<Modification>

In the third and fourth embodiments described above, the diode D2 for canceling the steady loss due to the direct-current resistance of the reactor L1 is provided, but when the steady loss of the reactor L1 does not have to be considered, the diode D2 may not be provided.

Moreover, in the above-mentioned embodiments, the IGBT is illustrated as the switching element, but the present invention is applicable to any element that can be switched, for example, an MOSFET, a bipolar transistor or the like.

F. Fifth Embodiment

Figure 9:
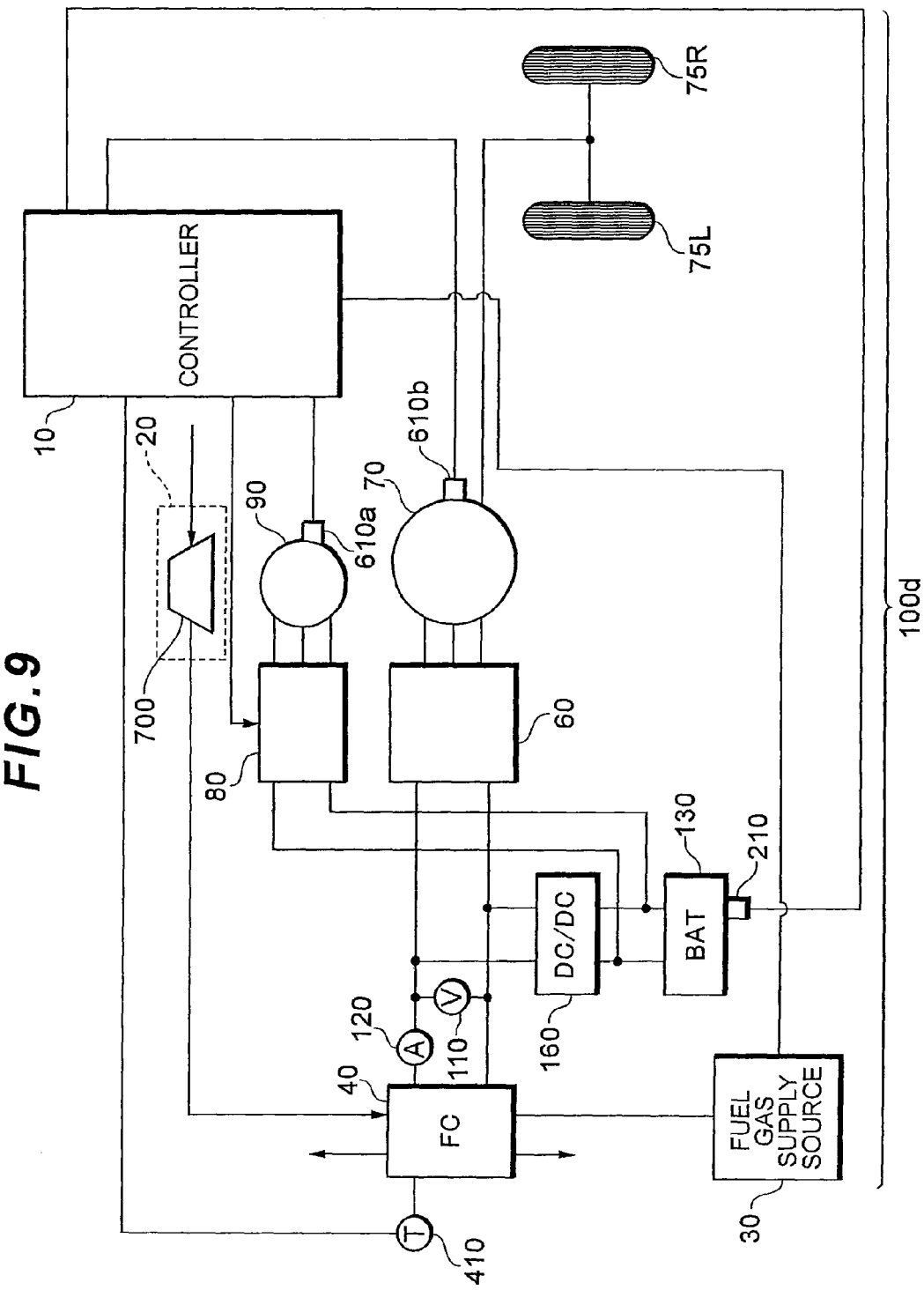
FIG. 9 is a diagram showing a constitution of a main part of a fuel cell system according to a fifth embodiment.

FIG. 9 is a diagram showing a constitution of a main part of a fuel cell system 100d according to a fourth embodiment. It is to be noted that components corresponding to those of the fuel cell system 100c shown in FIG. 8 are denoted with the same reference numerals, and detailed description thereof is omitted.

An oxidizing gas supply source 20 is constituted of an air compressor 700 and the like. The air compressor 700 adjusts an amount of an oxidizing gas to be supplied to a fuel cell 40 under control of a controller 10.

Figure 10:
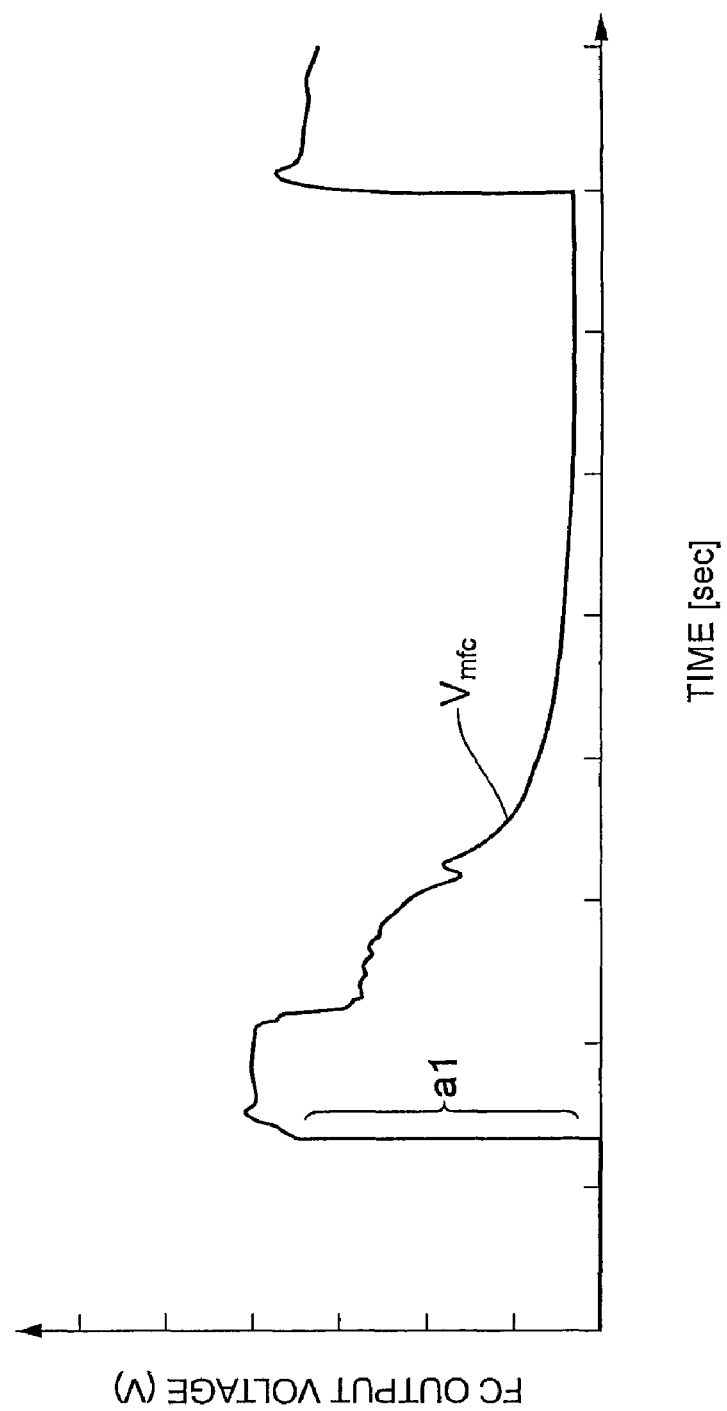
FIG. 10 is a diagram showing changes of an FC output voltage during starting of the system according to the embodiment.
Figure 11:
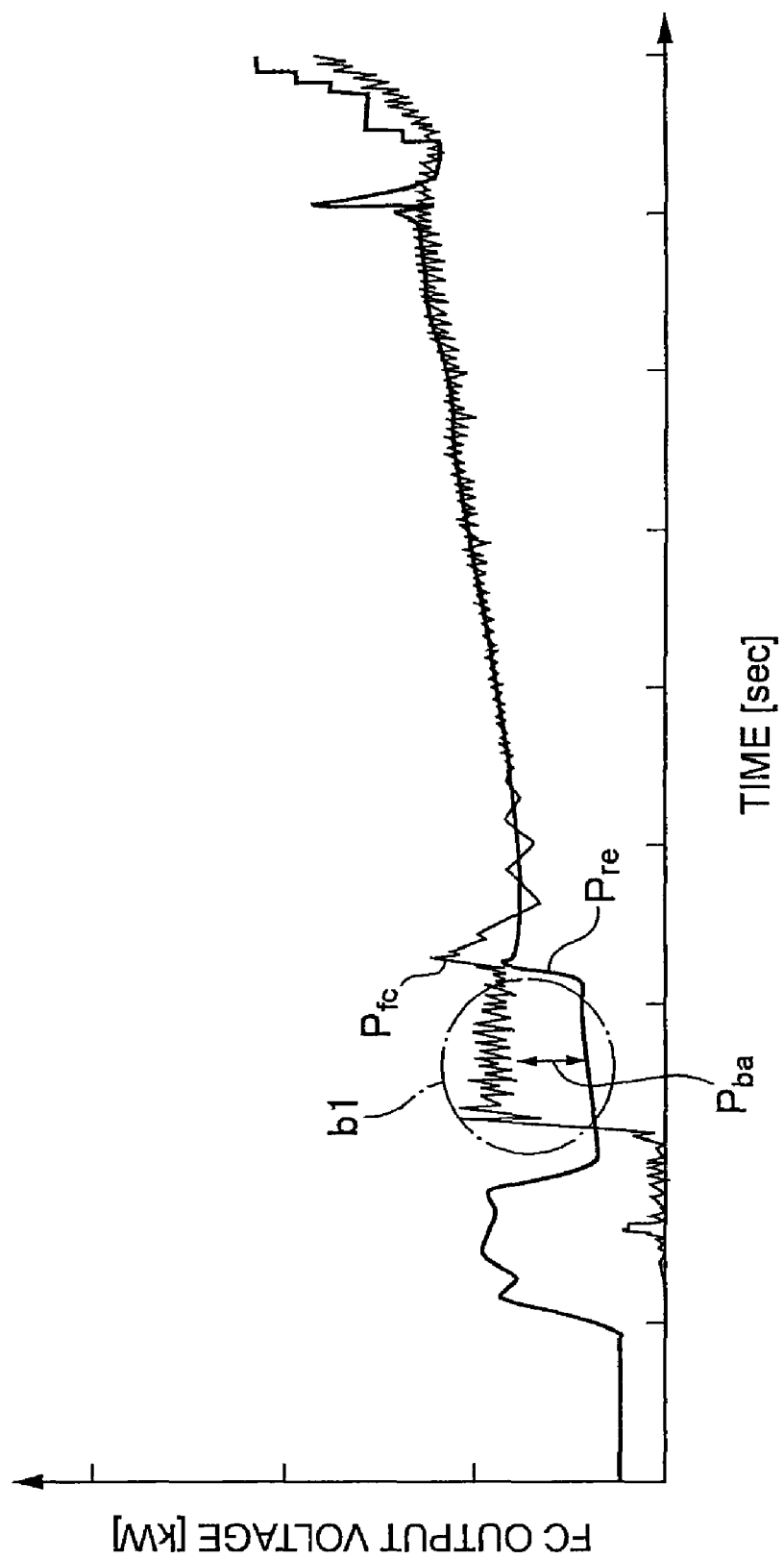
FIG. 11 is a diagram showing changes of the FC output voltage during the starting of the system according to the embodiment.
Figure 12:
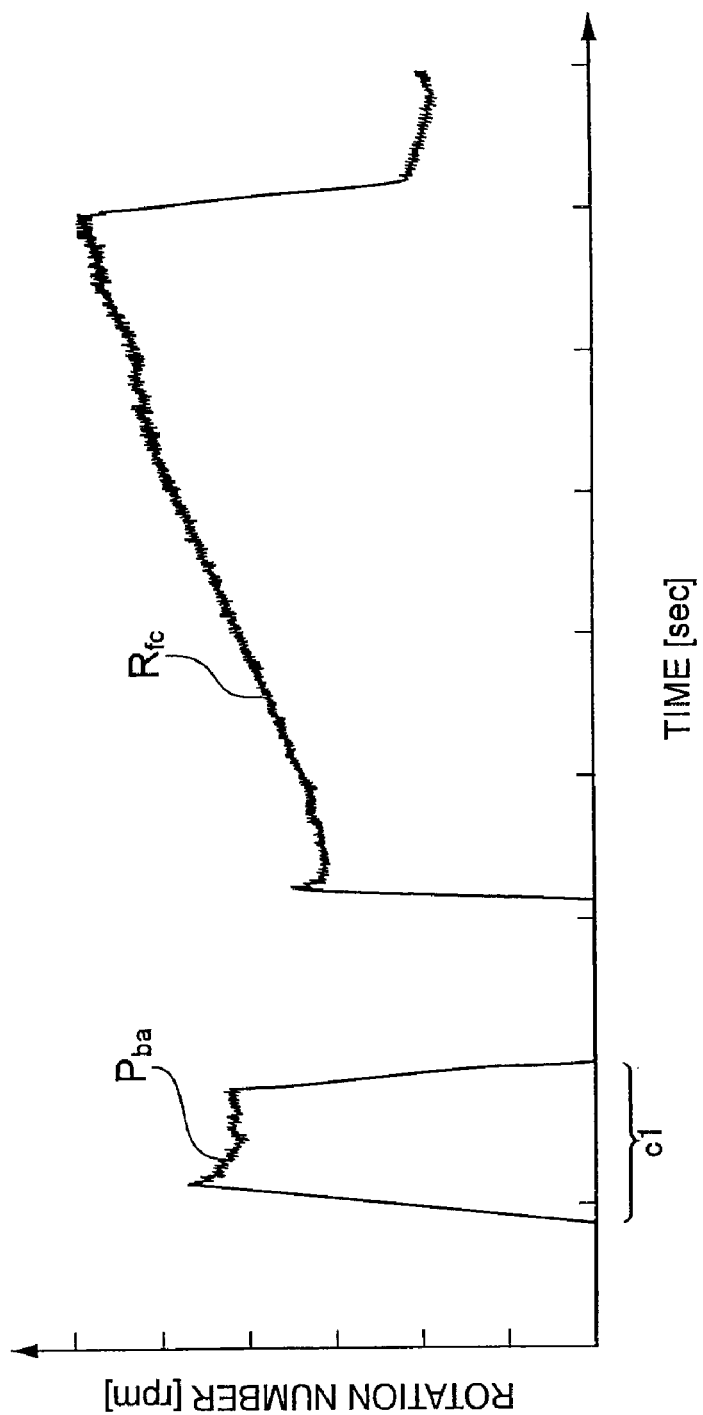
FIG. 12 is a diagram showing a rotation number of an air compressor during the starting of the system according to the embodiment.

FIGS. 10 to 12 are diagrams showing changes of an FC output voltage, an FC output power and a rotation number of the air compressor during starting of the system, respectively.

Prior to the system starting, the controller (inhibition means) 10 of the fuel cell system 100d controls a rotation number Rfc to supply the oxidizing gas to the fuel cell 40 for a predetermined time, and then stops the supply (see c1 shown in FIG. 12).

In accordance with this supply of the oxidizing gas, an FC output voltage Vmfc rises to the vicinity of an open circuit voltage (OCV) (see a1 shown in FIG. 10), but during the system starting, the FC output voltage Vmfc raised to the vicinity of the OCV needs to be lowered to a voltage of a low-efficiency operation region. Control for this purpose will be described. The controller (first determination means) 10 first adds up a system required power (driving energy of auxiliary devices or the like) Pre and a battery charging power Pba (see b1 shown in FIG. 11) to determine an FC output instruction power Pfc (see equation (17)).

$$Pfc=Pre+Pba \quad (17)$$

Subsequently, the controller (second determination means) 10 divides the obtained FC output instruction power Pfc by the FC output voltage (an actually measured value) Vmfc to obtain an FC output instruction current Ifc (see equation (18)).

$$Ifc=Pfc/Vmfc \quad (18)$$

Furthermore, the controller (third determination means) 10 obtains a deviation between the obtained FC output instruction current Ifc and the FC output current (the actually measured value) Imfc to feed back the obtained deviation to a change amount of the FC output voltage Vmfc (=a difference between the previously measured output voltage and the presently measured output voltage), whereby an FC output instruction voltage Vfc is calculated.

In a case where the controller 10 confirms that the FC output voltage lowers to the voltage of the low-efficiency operation region, the controller restarts the supply of the oxidizing gas by the air compressor 700 to start the operation at a low-efficiency operation point.

As described above, according to the present embodiment when the FC output voltage is lowered from the vicinity of the OCV to the voltage of the low-efficiency operation region, the supply of the oxidizing gas is stopped to obtain the deviation between the FC output instruction current Ifc and the FC output current (the actually measured value) Imfc, followed by feeding back the obtained deviation to the change amount of the FC output voltage Vmfc, whereby the operation at the low-efficiency operation point can quickly be started.

It is to be noted that in the above embodiment, a case where the FC output voltage is lowered from the vicinity of the OCV to the voltage of the low-efficiency operation region has been described, but the present invention is applicable to any case where the FC output voltage is lowered to a target voltage.

The invention claimed is:
1. A fuel cell system comprising:
 a controller including an inhibition system and first, second, and third determination systems;

a fuel cell which generates a power by use of a fuel gas and an oxidizing gas; and an air compressor for adjusting an amount of the oxidizing gas to be supplied to the fuel cell under control of the controller;

the controller programmed to:

inhibit supply of the oxidizing gas from the air compressor in a case where predetermined conditions are satisfied with the inhibition system;

determine a target power of the fuel cell at a time when the supply of the oxidizing gas is inhibited with the first determination system;

determine a target current based on the target power and an actually measured voltage of the fuel cell with the second determination system; and feed back a deviation between the target current and an actually measured current of the fuel cell to a change amount of the actually measured voltage of the fuel cell to determine a target voltage value with the third determination system, wherein the controller is programmed to stop the supply of the oxidizing gas from the air compressor in a case where an output voltage of the fuel cell is lowered from the vicinity of an opened circuit voltage to a voltage at a low-efficiency operation point with the inhibition system.

2. The fuel cell system according to claim 1, wherein the the controller is further programmed to determine the target power of the fuel cell at a time when the supply of the oxidizing gas is stopped with the first determination system.

\* \* \* \* \*